(12) United States Patent
Tsuji

(10) Patent No.: US 9,733,559 B2
(45) Date of Patent: Aug. 15, 2017

(54) DUAL CONTROLLER IMAGE PROJECTOR

(71) Applicant: Shigekazu Tsuji, Tokyo (JP)

(72) Inventor: Shigekazu Tsuji, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 55 days.

(21) Appl. No.: 14/707,130

(22) Filed: May 8, 2015

(65) Prior Publication Data

US 2015/0334361 A1    Nov. 19, 2015

(30) Foreign Application Priority Data

May 13, 2014  (JP) .................................. 2014-099537

(51) Int. Cl.
| | | |
|---|---|---|
| *G03B 21/00* | (2006.01) | |
| *G03B 21/20* | (2006.01) | |
| *H04N 9/31* | (2006.01) | |
| *G02B 26/08* | (2006.01) | |
| *G03B 21/14* | (2006.01) | |
| *G06F 1/32* | (2006.01) | |

(52) U.S. Cl.
CPC ....... *G03B 21/206* (2013.01); *G02B 26/0833* (2013.01); *G03B 21/005* (2013.01); *G03B 21/008* (2013.01); *G03B 21/14* (2013.01); *H04N 9/3111* (2013.01); *H04N 9/3155* (2013.01); *G06F 1/3203* (2013.01); *G06F 1/3287* (2013.01); *H04N 9/3114* (2013.01)

(58) Field of Classification Search
CPC   G02B 26/0833; G03B 21/005; G03B 21/008; G03B 21/14; G03B 21/206; H04N 9/3111; H04N 9/3155; H04N 9/3114; G06F 1/3203; G06F 1/3287

See application file for complete search history.

(56) References Cited

U.S. PATENT DOCUMENTS

| | | | | |
|---|---|---|---|---|
| 2006/0001840 A1* | 1/2006 | Kurihara | .............. | H04N 9/3179 |
| | | | | 353/85 |
| 2006/0290825 A1 | 12/2006 | Onishi et al. | | |
| 2013/0179700 A1 | 7/2013 | Toda et al. | | |

FOREIGN PATENT DOCUMENTS

| | | |
|---|---|---|
| CN | 1885934 A | 12/2006 |
| EP | 1613100 A2 | 1/2006 |
| JP | 2005-269864 | 9/2005 |
| JP | 2006308934 A | 11/2006 |

(Continued)

OTHER PUBLICATIONS

Chinese Office Action dated Jul. 21, 2016.

*Primary Examiner* — Sultan Chowdhury
*Assistant Examiner* — Magda Cruz
(74) *Attorney, Agent, or Firm* — Harness, Dickey & Pierce, P.L.C.

(57) ABSTRACT

An image projector includes: a light source to emit light; an image forming element irradiated with the light from the light source and to form an image for projection onto a projection surface; a first controller activated when the image projector is in a waiting state; and a second controller that is not activated when the image projector is in the waiting state. In response to detection of an execution request for executing the image projector in the waiting state at the first controller, the first controller sets a power supply circuit with an initial voltage to start supplying power to the light source, and when the light source is lighted at the initial voltage, activates the second controller.

15 Claims, 7 Drawing Sheets

(56) References Cited

FOREIGN PATENT DOCUMENTS

| JP | 2007-034263 | 2/2007 |
|----|-------------|--------|
| JP | 2007219164 A | 8/2007 |
| JP | 2010-160195 | 7/2010 |

\* cited by examiner

DUAL CONTROLLER IMAGE PROJECTOR

CROSS-REFERENCE TO RELATED APPLICATIONS

This patent application is based on and claims priority pursuant to 35 U.S.C. §119(a) to Japanese Patent Application No. 2014-099537, filed on May 13, 2014, in the Japan Patent Office, the entire disclosure of which is hereby incorporated by reference herein.

BACKGROUND

Technical Field

The present invention generally relates to an image projector and a method of controlling the image projector.

Description of the Related Art

The recent projectors, such as digital light processing (DLP) projectors with digital micro-mirror devices (DMDs), which are small and light, are widely used at offices and schools as well as at homes.

There are various developments for the projectors to achieve, for example, higher resolution of liquid crystal panels, improved efficiency in light sources such as lamps, and reduction in manufacturing costs. Among them, there is a need for reducing execution time, that is, the time counted from the time when the power of the projector is turned on to start lighting the lamp, to the time when the light level of the lamp reaches a sufficient level for projection, for example, as described in Japanese Patent Application Publication Nos. 2010-160195 and 2007-34263.

For example, Japanese Patent Application Publication No. 2007-34263 discloses an image display apparatus, which activates a power source circuit when pressing of a power key is detected, and sets a lamp ballast circuit with a preset voltage to start driving the lamp, thus reducing execution time of the image display apparatus. However, in order to detect pressing of the power key, a microcomputer that consumes relatively high power is kept turned on, thus increasing power consumption of the image display apparatus.

SUMMARY

Example embodiments of the present invention include an image projector, which includes: a light source to emit light; an image forming element irradiated with the light from the light source and to form an image for projection onto a projection surface; a first controller activated when the image projector is in a waiting state; and a second controller that is not activated when the image projector is in the waiting state. In response to detection of an execution request for executing the image projector in the waiting state at the first controller, the first controller sets a power supply circuit with an initial voltage to start supplying power to the light source, and when the light source is lighted at the initial voltage, activates the second controller.

Example embodiments of the present invention include a method of controlling the image projector.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
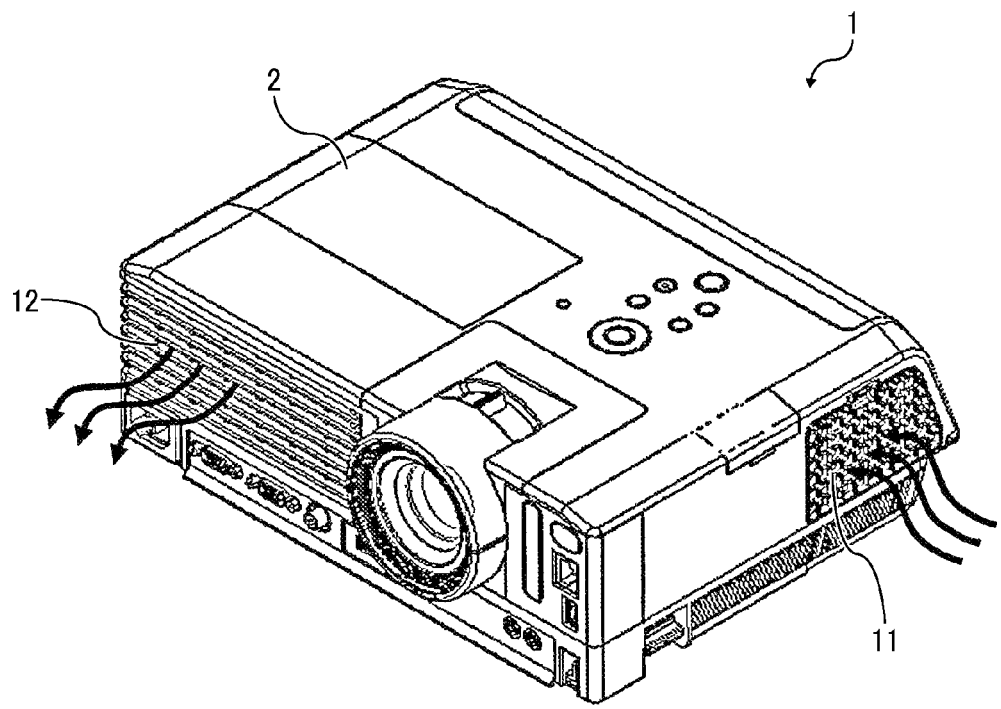
FIG. 1 is a perspective view illustrating the outer appearance of an image projector according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring to FIGS. 1 to 8, an image projector 1 is explained according to an example embodiment of the present invention.

(Configuration of Image Projector)

Figure 2:
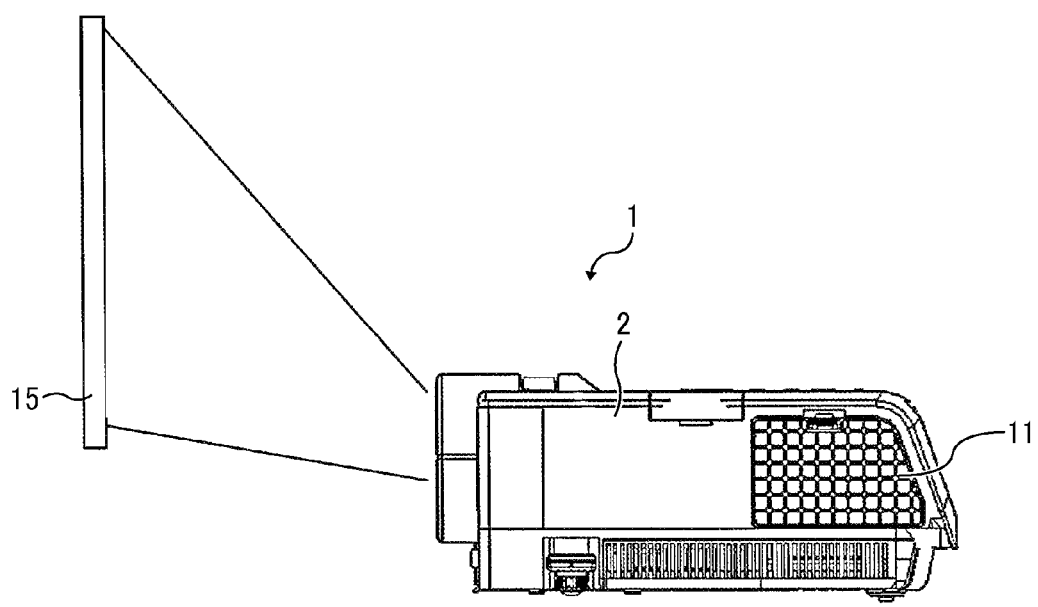
FIG. 2 is a side view illustrating the image projector of FIG. 1, which projects an image on a projection surface.
Figure 5:
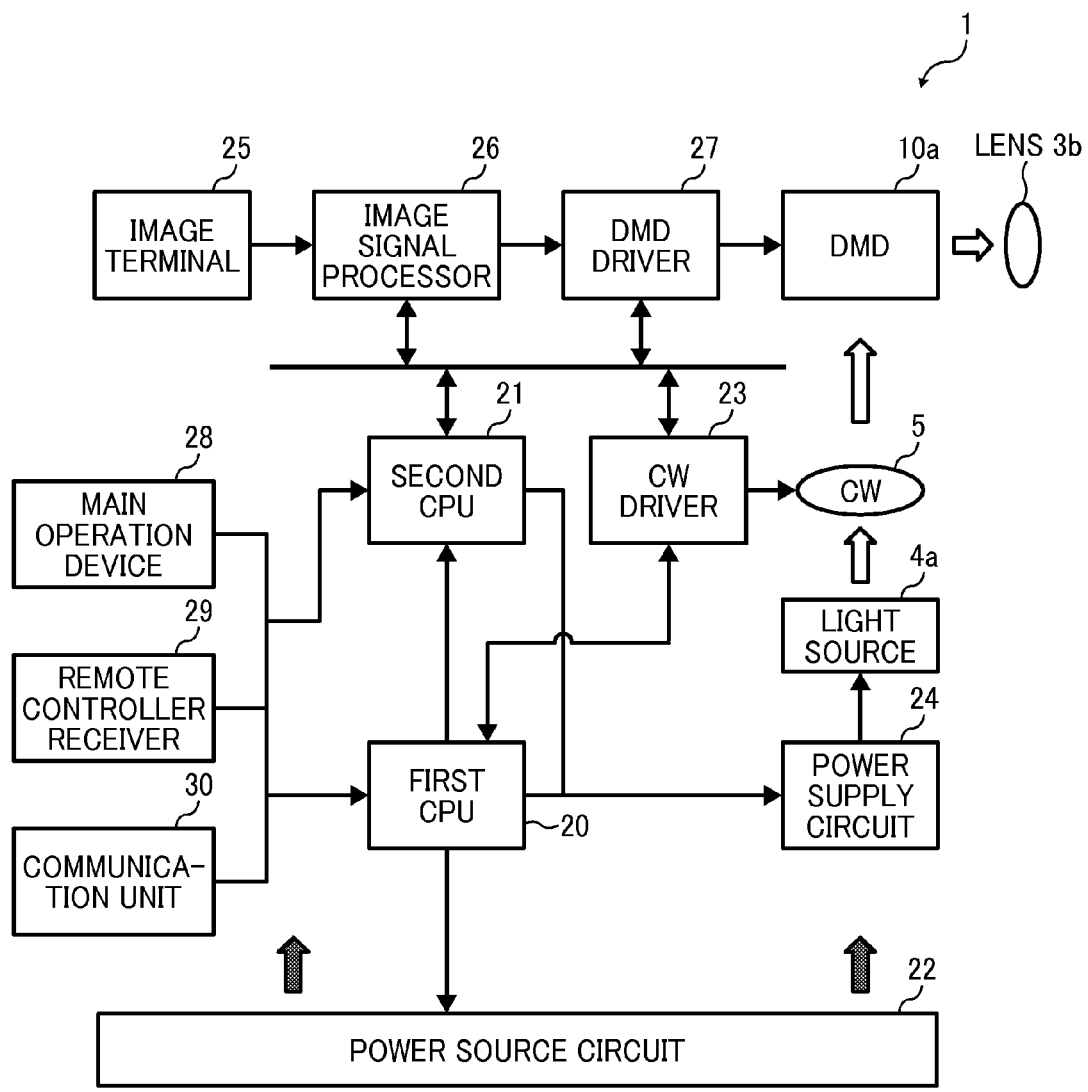
FIG. 5 is a schematic block diagram illustrating a structure of the image projector of FIG. 1.

The image projector 1 includes a light source 4a (FIG. 5) that emits light having a light level defined by a preset voltage, and an image forming element that forms an image with the emitted light such as a digital mirror device (DMD) 10a (FIG. 5). As illustrated in FIG. 2, the image projector 1 projects the image formed on the DMD 10a onto a projection surface such as a screen 15.

Referring to FIG. 5, the image projector 1 further includes a first controller such as a first CPU 20 that is activated when the image projector 1 is in a waiting state, and a second controller such as a second CPU 21 that is not activated when the image projector 1 is in the waiting state. The image projector 1 further includes a power supply circuit (lamp ballast circuit) 24 that supplies power to the light source 4a. In response to a request for executing the image projector 1 in the waiting state, the first CPU 20, which detects the execution request, sets an initial voltage for the power supply circuit 24, and further executes the second CPU 21 when the light source 4a is lighted at the initial set value.

In this disclosure, the "waiting state" indicates any state in which power consumption is kept low, such that the image projector 1 being connected to an AC power supply is turned off. In the waiting state, a main controller of the image projector 1, that is, a main microcomputer controlling operation of the image projector 1 is turned off, but hardware that accepts an execution request for executing the image projector 1 keeps operating. More specifically, in this example, the second CPU 21 functions as the main controller.

FIG. 1 is a perspective view illustrating the outer appearance of the image projector 1, according to an example embodiment of the present invention. FIG. 2 is a side view illustrating the image projector 1, which projects an image onto the projection surface such as the screen 15.

The image projector 1 generates an image based on image data (picture data), which may be input from an information processing device such as a personal computer or an image capturing device such as a video camera. The image projector 1 projects the image onto the screen 15. Since the information processing device connected to the image projector 1 via wired or wireless network provides image data to the image projector 1, the information processing device is referred to as an image supply device.

The image projector 1 further includes a lamp functioning as the light source 4a, and various electric circuits, in its inside. These devices are protected from the outside with an outer cover 2 (FIG. 1). The image projector 1 further includes an air intake 11 and an air exhaust 12. The air flows from the intake 11 toward the exhaust 12, to cool inside the image projector 1, thus preventing the internal temperature from exceeding an operating temperature limit.

Figure 3A:
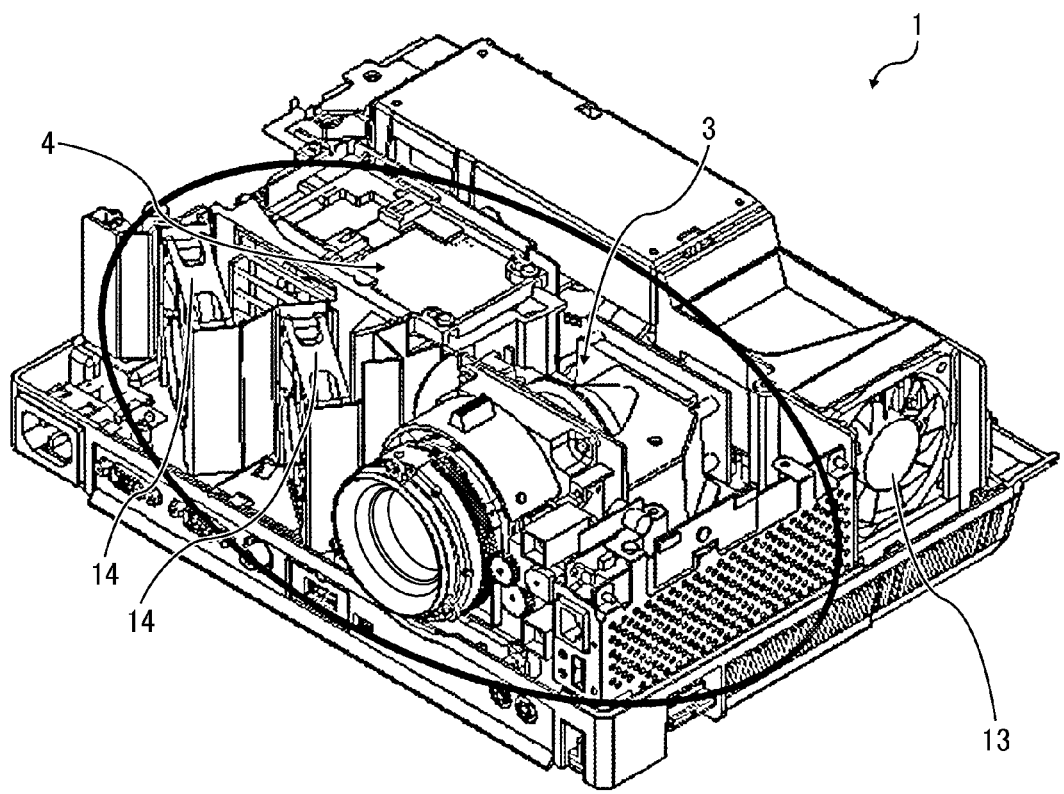
FIG. 3A is a perspective view illustrating the image projector of FIG. 1 when an outer cover is removed.
Figure 3B:
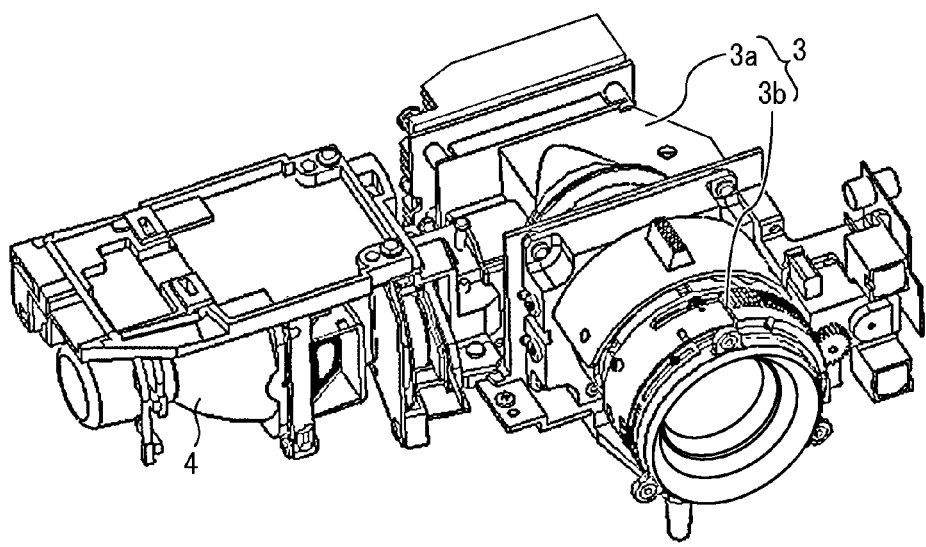
FIG. 3B is an enlarged view of a selected portion of the image projector of FIG. 3A.

FIG. 3A illustrates the image projector 1, when the outer cover 2 is removed. FIG. 3B is an enlarged view of a selected portion of the image projector 1 as indicated by the circle in FIG. 3A. As illustrated in FIGS. 3A and 3B, the image projector 1 includes an optical engine 3 having an optical irradiation unit 3a and an optical projection unit 3b, and a light source unit 4.

Figure 4:
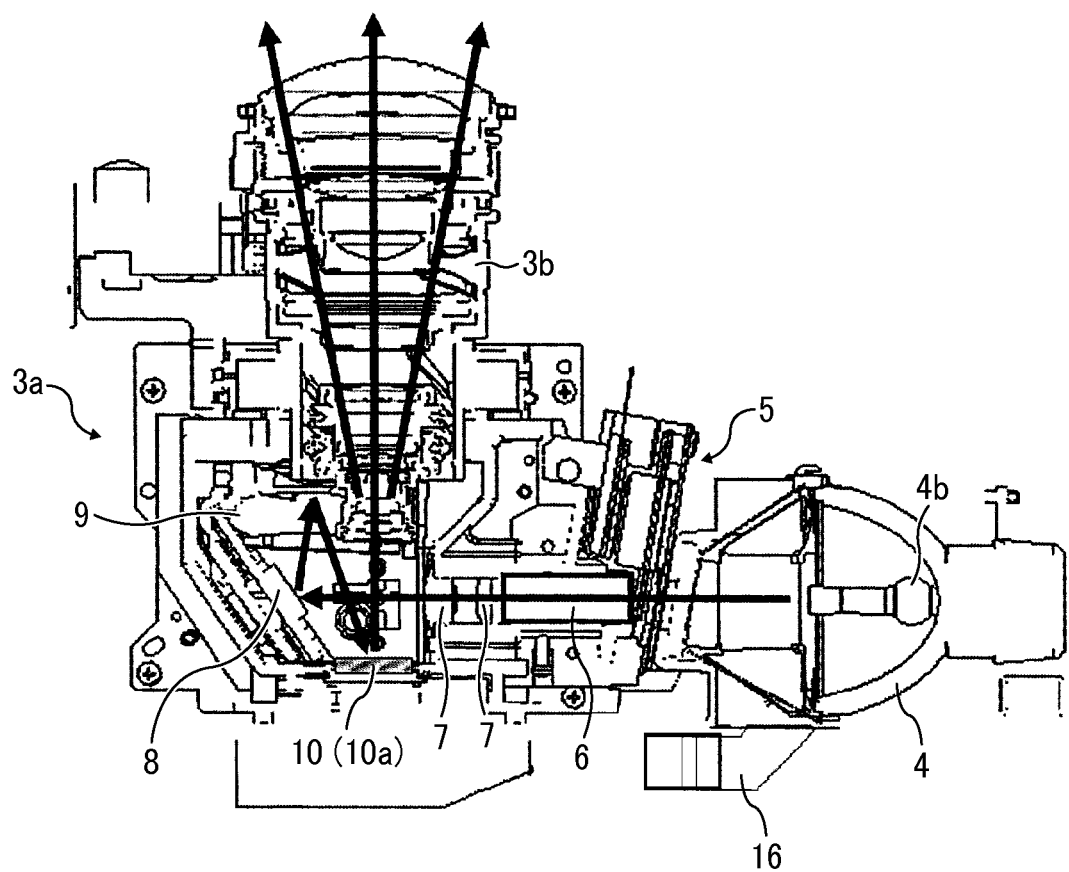
FIG. 4 is a cross-sectional view illustrating the image projector of FIG. 3A viewed from the top.

FIG. 4 is a cross-sectional view illustrating the image projector 1 when viewed from the top, with the optical irradiation unit 3a, the optical projection unit 3b, and the light source unit 4.

As illustrated in FIG. 3A, an intake fan 13 and exhaust fans 14 are provided inside the image projector 1 at locations corresponding to the air intake 11 and the air exhaust 12, respectively. As air, which is taken from the outside by the intake fan 13, flows inside the image projector 1 and is expelled outside through the exhaust fans 14, the internal temperature is kept low.

The light source 4a (lamp 4a) of the light source unit 4 irradiates the optical irradiation unit 3a of the optical engine 3, with light (white-color light) having a light level defined by a preset voltage value. The optical irradiation unit 3a divides the white-color light into light components of red, green, and blue, respectively, and guides the light components to an image forming element unit 10 (FIG. 4). The image forming element unit 10, with the DMD 10a, forms an image according to a modulated signal. The optical projection unit 3b projects an enlarged image of the formed image onto the screen 15.

In this example, any desired lamp may be used as the light source 4a of the light source unit 4. For example, an arc lamp, such as a high-pressure mercury arc lamp may be used. The light source unit 4 is provided with a cool fan 16 that cools down the light source unit 4, at its side.

The optical irradiation unit 3a of the optical engine 3 is provided with a color wheel (CW) 5 that divides the light emitted from the light source 4a, and a light tunnel 6 that guides the light emitted from the color wheel 5 to an optical irradiation system. The optical irradiation system includes relay lens 7, a flat mirror 8, and a concave mirror 9. The optical irradiation unit 3a includes the image forming element unit 10 in its inside. The CW 5 is a disc having filters of different colors arranged along the circumferential direction of the disc. More specifically, the CW 5 is divided into sections of red, green, and blue, each of which transmits light.

At the optical irradiation unit 3a, the CW 5, as it rotates, converts the white-color light from the light source 4a, into light having patterns of red, green, and blue that are repeated per unit time. The light from the CW 5 passes through the light tunnel 65, which is formed of a plurality of flat glasses that are bonded together to a tubular shape.

The light, which passes through the light tunnel 6, is focused onto the relay lens 7 formed of two lenses. At the relay lens 7, chromatic aberration of the light on the optical axis is corrected. The light, from the relay lens 7, is reflected by the flat mirror 8 and the concave mirror 9, toward the DMD 10a of the image forming element unit 10. The DMD 10a has a substantially rectangular mirror surface, which is formed of a plurality of micromirrors. The DMD 10a processes a projection light, such that each micromirror is time-shared according to image data to form a specific image at a time.

The light used by the micromirrors of the DMD 10a that are time-shared based on the image data is reflected toward a projection lens, while the other light not used by the DMD 10a is reflected toward an OFF light plate. The light used by the image forming element unit 10 is reflected to the optical projection unit 3b, passes through a plurality of projection lenses of the optical projection unit 3b, and is projected onto the screen 15 as an enlarged image.

FIG. 5 is a schematic block diagram illustrating a structure of the image projector 1. The image projector 1 includes the first CPU 20, the second CPU 21, a power source circuit 22, a color wheel driver (CW driver) 23, the power supply circuit 24, an image terminal 25, an image signal processor 26, a DMD driver 27, a main operation device 28, a remote controller receiver 29, and a communication unit 30. The image projector 1 is further installed with at least a control program for the first CPU 20 and a control program for the second CPU 21, in its memory.

In the image projector 1, the first CPU 20 is provided so as to reduce power consumption when the image projector 1 is in the waiting state. More specifically, the first CPU 20 functions as the first controller, which activates the image projector 1. The first CPU 20 is activated in the waiting state, in which the image projector 1 connected to the AC power supply is turned off.

As described below, it is assumed that the user inputs an execution request that requests to turn on the image projector 1 that is in the waiting state. In response to detection of an execution request signal indicating such execution request, the first CPU 20 performs initial setting of a voltage to start driving the light source 4a, and activates the second CPU 21.

The execution request that requests to turn on the power of the image projector 1 may be input through the main operation device 28, a remote operation device such as a remote controller, and an image supply device connected to the image projector 1 such as a personal computer. In response to the execution request, the first CPU 20 receives an execution request signal from the main operation device 28, the remote controller receiver 29, and the communication unit 30.

When the power of the image projector 1 is turned on, such that the image projector 1 is switched from the waiting state to an operating state, the second CPU 21 controls various operations of the image projector 1 to project the image on the projection surface. The second CPU 21 is activated in response to the execution request from the first CPU 20, such that the second CPU 21 does not operate when the image projector 1 is in the waiting state such as when the power of the image projector 1 is turned off.

The second CPU 21 is a main microcomputer that controls various devices of the image projector 1 to perform various operations, which cooperates with any peripheral circuit in the image projector 1. The peripheral circuit thus needs to be activated with the second CPU 21. In contrary, the first CPU 20 performs execution of the second CPU 21 to cause the image projector 1 to switch from the waiting state to the operating state.

The first CPU 20 thus has a terminal design power (TDP) that is smaller than that of the second CPU 21. With this configuration, power consumption of the first CPU 20 is much less than that of the second CPU 21. While power consumption differs depending on specific structure of the image projector 1, in this example, power consumption required for the first CPU 20 to monitor an execution request in the waiting state is about 0.2 W. Power consumption required for the second CPU 21 to perform the same operation (that is, to monitor an execution request in the waiting state) is about 1 W.

The power source circuit 22 is a circuit that supplies power to various devices in the image projector 1. The power source circuit 22 is activated by the first CPU 20 in response to an execution request signal received at the first CPU 20 in the waiting state, and starts supplying power to the power supply circuit 24 and the CW driver 23.

The CW driver 23 rotates the CW 5, using power supplied from the power source circuit 22. The first CPU 20 controls the CW driver 23 only when activating the CW driver 23 from the waiting state. Once the image projector 1 is activated, the second CPU 21 controls the CW driver 23.

The power supply circuit 24 supplies power to the light source 4a, with a preset voltage value that is initially set. More specifically, under control of the CPU 20 or 21, the power supply circuit 24 controls light intensity of the light source 4a.

The power source circuit 22 supplies power to the power supply circuit 24. The first CPU 20 controls the power supply circuit 24 only when activating the power supply circuit 24 from the waiting state. Once the image projector 1 is activated, the second CPU 21 controls the power supply circuit 24.

The image terminal 25 receives an image signal from the image supply device through a cable connected to the image terminal 25. Examples of image supply device include an information processing device such as a personal computer (PC), and a reproducing device such as a DVD player. The image supply device may be connected to the image projector 1 via a converter such as a set top box. The image projector 1 may receive an image signal from the image supply device via wired or wireless network.

The image signal processor 26 processes image contrast adjustment, brightness adjustment, sharpness adjustment, scaling, and OSD of menu data, according to an image signal received from the image supply device. The OSD (on-screen display) is an image superimposed on a screen picture.

The DMD driver 27 controls on or off of mirrors in the DMD 10a that are arranged by pixel, to project a color image. According to the image signal from the image signal processor 26, the second CPU 21 controls the DMD 10a to form an image based on the image signal, and further projects, via the optical projection unit 3b (lens), the image onto the screen 15.

The main operation device 28 is provided with various operation keys on the outer surface of the image projector 1, and a LED that is lighted on to indicate a current operating state of the image projector 1. The keys on the main operation device 28 include a power key that is selected to turn on or off the power of the image projector 1, a menu key that allows a user to input various settings, a ten key, a conformation key, an input key that switches an input signal, etc. When the main operation device 28 receives a request for turning on the power of the image projector 1 in the waiting state, the main operation device 28 sends an execution request signal to the first CPU 20.

The remote controller receiver 29 receives a control signal from the remote operation device, such as the remote controller, for example, via infrared communication. The remote controller is provided with keys that are similar to those keys for the main operation device 28. When the remote controller receiver 29 receives a control signal for turning on the power of the image projector 1 in the waiting state, from the remote controller, the remote controller receiver 29 sends the execution request signal to the first CPU 20.

The communication unit 30 allows the image projector 1 to communicate with an external device such as the image supply device through a LAN cable, USB cable, HDMI cable, RS232C cable, etc. When the communication unit 30 receives a control signal for turning on the power of the image projector 1 in the waiting state, from the image supply device, the communication unit 30 sends the execution request signal to the first CPU 20.

Figure 6:
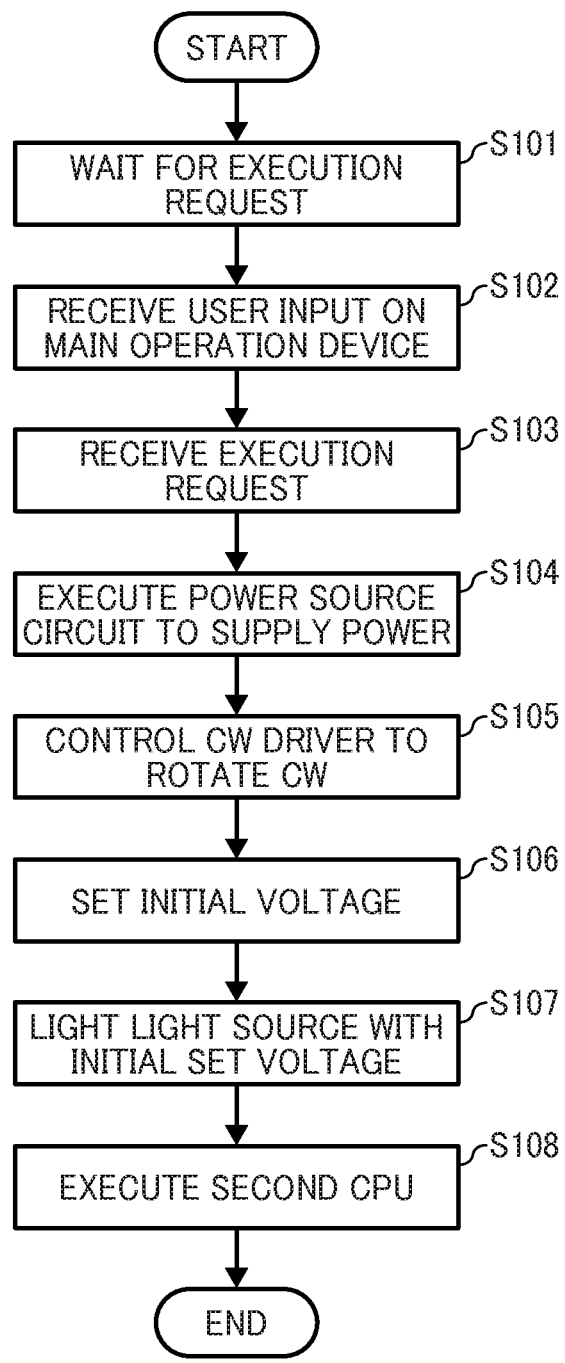
FIG. 6 is a flowchart illustrating operation of activating the image projector of FIG. 1 according to an example embodiment of the present invention.

Referring to FIG. 6, operation of processing an execution request for executing the image projector 1 is explained according to an example embodiment of the present invention. FIG. 6 illustrates the case where the main operation device 28 receives the execution request. Further, it is assumed that the image projector 1 is in the waiting state, such that the first CPU 20 is executed, while the second CPU 21 is not executed.

At S101, the first CPU 20 waits for an execution request from the user.

At S102, the main operation device 28 receives a user selection of the "ON" key on the main operation device 28.

At S103, the first CPU 20 receives the execution request, that is, an execution request signal, from the main operation device 28.

At S104, the first CPU 20, which receives the execution request, executes the power source circuit 22 such that the power source circuit 22 supplies power to various devices such as the CW driver 23 and the power supply circuit 24.

At S105, the first CPU 20 controls the CW driver 23 to rotatatably drive the color wheel 5.

At S106, the first CPU 20 executes the power supply circuit 24 with an initial voltage that is preset, and causes the power supply circuit 24 to supply power to the lamp 4a.

As described above, the CW 5 is rotated at S105 before lighting the lamp 4a at S106. If the CW 5 is lighted while the CW 5 stops rotating, the CW 5 may be burned as the CW 5 is heated.

At S107, the lamp 4a is lighted at the initial voltage, thus outputting light having a light level as defined by the initial voltage.

At S108, the first CPU 20 activates the second CPU 21.

As long as the second CPU 21 is activated, an operation request from the main operation device 28 is received at the second CPU 21, such that the second CPU 21 controls operation.

Figure 7:
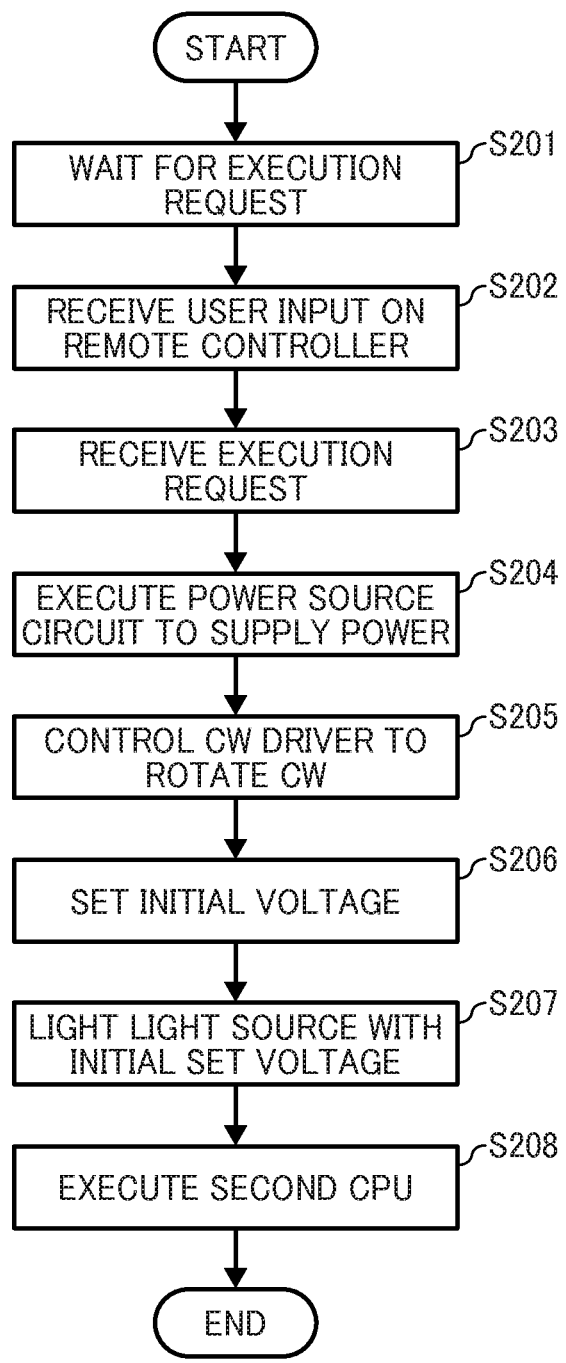
FIG. 7 is a flowchart illustrating operation of activating the image projector of FIG. 1 according to an example embodiment of the present invention.

FIG. 7 is a flowchart illustrating operation of processing an execution request for executing the image projector 1, according to an example embodiment of the present invention. FIG. 7 illustrates the case where the remote controller, which is one example of the remote control device, receives the execution request. Further, it is assumed that the image projector 1 is in the waiting state, such that the first CPU 20 is executed, while the second CPU 21 is not executed.

At S201, the first CPU 20 waits for an execution request from the user.

In response to a user input that instructs to execute the image projector 1 on the remote controller, the remote controller sends a control signal for turning on the power of the image projector 1 to the image projector 1 via a network such as a wireless network. At S202, the remote controller receiver 29 receives the control signal for turning on the power of the image projector 1.

At S203, the first CPU 20 receives the execution request, that is, the control signal, from the remote controller receiver 29.

S204 to S208 are performed in a substantially similar manner as described above referring to S104 to S108 of FIG. 6.

Figure 8:
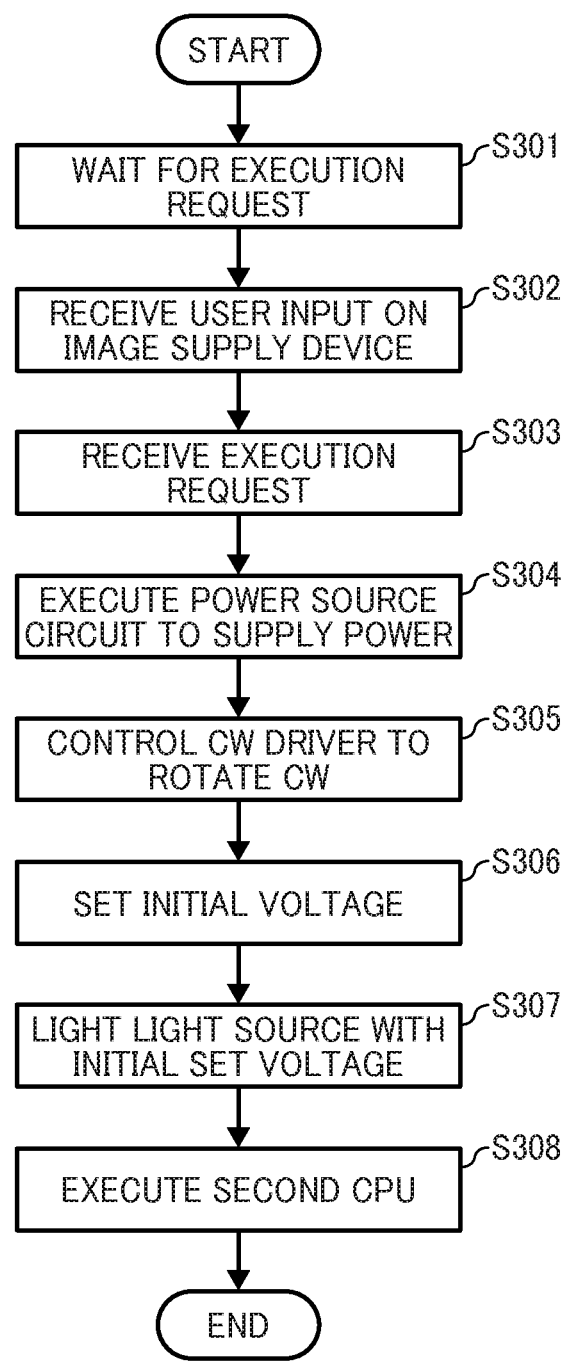
FIG. 8 is a flowchart illustrating operation of activating the image projector of FIG. 1 according to an example embodiment of the present invention.

FIG. 8 is a flowchart illustrating operation of processing an execution request for executing the image projector 1, according to an example embodiment of the present invention. FIG. 8 illustrates the case where the image supply device, such as the PC, receives the execution request. Further, it is assumed that the image projector 1 is in the waiting state, such that the first CPU 20 is executed, while the second CPU 21 is not executed.

At S301, the first CPU 20 waits for an execution request from the user.

In response to a user input that instructs to execute the image projector 1 on the image supply device, the image supply device sends a control signal for turning on the power of the image projector 1 to the image projector 1 via a network. At S302, the communication unit 30 receives the control signal for turning on the power of the image projector 1.

At S303, the first CPU 20 receives the execution request, that is, the control signal, from the communication unit 30.

S304 to S308 are performed in a substantially similar manner as described above referring to S104 to S108 of FIG. 6.

When the image projector 1 receives a plurality of execution requests from at least two of the main operation device 28, remote controller receiver 29, and communication unit 30, the first CPU 20 of the image projector 1 performs execution processing based on the execution request that is received first. Once the second CPU 21 is executed, the second CPU 21 receives various signals from any one of the main operation device 28, remote controller receiver 29, and communication unit 30.

As described above, the image projector 1 causes the second CPU 21, that is, the main microcomputer, stop operating in the waiting state. The first CPU 20, that is, a microcomputer with a low power consumption rate, of the image projector 1 keeps operating in the waiting state to detect an execution request. In response to the execution request, the first CPU 20 starts supplying power to the light source (lamp) 4a with a preset voltage value. With this configuration, power consumption is suppressed, while reducing time required for the light source 4a to be lighted at a sufficient level for projection.

If the main microcomputer, that is, the second CPU 21 keeps operating in the waiting state, it may be difficult to suppress power consumption. In the above-described embodiment, the image projector 1 is provided with a microcomputer with a low power consumption rate, such that power consumption in the waiting state is suppressed.

Further, if the main microcomputer (the second CPU 21) is not operating at least partially in the waiting state, it requires longer time to execute the image projector 1. For example, in response to detection of an execution request, the main microcomputer needs to be electrically executed while activating a program for the main microcomputer and initializing such program. The main microcomputer, which is executed, can then turn on the power supply circuit to set the light source 4a with a preset voltage. In contrary, in the above-described embodiment, the first CPU 20 keeps operating in the waiting state, such that time required for executing the CPU 20 including time for executing and initializing a program for the CPU 20 is not needed. This reduces time for executing the image projector 1 (that is, the time from receiving the execution request to the time for lighting the light source 4a), by 1 to 2 seconds.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. An image projector, comprising:
a light source configured to emit light;
an image forming element configured to form an image for projection onto a projection surface based on being irradiated with the light emitted by the light source; and
a first controller and a second controller that are each separately configured to control a power supply circuit to supply electrical power to the light source, respectively,
the second controller being configured to be selectively activated or deactivated based on whether the image projector is in an operating state or a waiting state, respectively, and the first controller being configured to be active at least when the image projector is in the waiting state;
the first controller further being configured to activate the image projector,
based on a detection of an execution request associated with executing the image projector, the detection being concurrent with the image projector being in the waiting state and the activating of the image projector including,
the first controller being configured to sets the power supply circuit with an initial voltage to initiate a supply of electrical power to the light source to activate the light source at an initial voltage, and
the first controller being configured to activate the second controller from a deactivated state, such that the second controller is configured to control the power supply circuit to supply electrical power to the light source, based on a determination that the light source is activated at the initial voltage.

2. The image projector of claim 1, further comprising:
a color wheel on an optical path from the light source and configured to divide the light from the light source while rotating,
wherein activating the image projector includes the first controller causing the color wheel to rotate prior to setting the power supply circuit.

3. The image projector of claim 1, wherein,
the first controller is associated with a first power consumption level and the second controller is associated with a second power consumption level, and
the first power consumption level is less than the second power consumption level.

4. The image projector of claim 1, wherein the second controller is configured to control the image projector to project the image onto the projection surface, subsequently to being executed by the first controller.

5. The image projector of claim 1, further comprising:
an operation device configured to receive a user input that includes an instruction to execute the image projector,
wherein the execution request is a signal that is generated by the operation device in response to the user input.

6. The image projector of claim 1, further comprising:
a receiver configured to receive a control signal from a remote controller of the image projector,
wherein the execution request is the control signal that is received from the remote controller in response to a user input that includes an instruction to execute the image projector.

7. The image projector of claim 1, further comprising:
a communication interface configured to receive a control signal from an image supply device connected to the image projector,
wherein the execution request is the control signal that is received from the image supply device in response to a user input that includes an instruction to execute the image projector.

8. A method of controlling an image projector, comprising:
activating a first controller and inactivating a second controller based on a determination that the image projector is in a waiting state, the first controller and the second controller each separately configured to control a power supply circuit to supply electrical power to a light source, respectively;
setting, at the first controller, the power supply circuit with an initial voltage to start supplying power to a light source, based on detecting an execution request associated with executing the image projector, the detecting being concurrent with the image projector being in the waiting state; and
activating, at the first controller, the second controller from a deactivated state, such that the second controller is configured to control the power supply circuit to supply electrical power to the light source, based on a determination that the light source is activated at the initial voltage.

9. The method of claim 8, further comprising:
causing a color wheel to rotate prior to setting the power supply circuit, the color wheel being on an optical path from the light source and configured to divide light from the light source while rotating.

10. The method of claim 8, wherein, the first controller is associated with a first power consumption level and the second controller is associated with a second power consumption level, and the first power consumption level is less than the second power consumption level.

11. The method of claim 8, further comprising:

controlling the image projector, at the second controller and based on activating the second controller, to project an image onto a projection surface.

12. The method of claim 8, further comprising:

receiving, at a communication interface, a user input that includes an instruction to execute the image projector; and generating the execution request based on the user input.

13. A non-transitory computer readable storage medium storing a program of instructions that, when executed by a first controller of an image projector, cause the first controller to:

detecting, at the first controller and concurrently with the image projector being in a waiting state such that the first controller is activated and a second controller is deactivated, an execution request associated with executing the image projector, the first controller and the second controller separately configured to control a power supply circuit to supply electrical power to a light source, respectively;

setting, at the first controller, the power supply circuit with an initial voltage to start supplying power to the light source, based on the detecting; and activating, at the first controller, the second controller, such that the second controller is configured to control the power supply circuit to supply electrical power to the light source, based on a determination that the light source is activated at the initial voltage.

14. The non-transitory computer readable storage medium of claim 13, wherein the program of instructions, when executed by the first controller, further cause the first controller to, cause a color wheel to rotate, based on the detecting and before setting the power supply circuit, the color wheel being on an optical path from the light source and configured to divide light from the light source while rotating.

15. The non-transitory computer readable storage medium of claim 13, wherein, the first controller is associated with a first power consumption level and the second controller is associated with a second power consumption level, and the first power consumption level is less than the second power consumption level.

\* \* \* \* \*